United States Patent [19]
Bosselaers

[11] 3,879,683
[45] Apr. 22, 1975

[54] SAWTOOTH WAVEFORM GENERATOR

[75] Inventor: Robert Jan Bosselaers, Winchester, Mass.

[73] Assignee: RCA Corporation, New York, N.Y.

[22] Filed: June 6, 1973

[21] Appl. No.: 367,542

[52] U.S. Cl. .................. 331/111; 307/228; 328/35; 328/181; 331/145
[51] Int. Cl. .......................................... H03k 3/282
[58] Field of Search ................ 331/111, 113 R, 145; 307/289, 290, 291, 292, 227, 228; 328/181–185, 35

[56] References Cited

UNITED STATES PATENTS

| | | | |
|---|---|---|---|
| 3,066,231 | 11/1962 | Slobodzinski et al. | 331/145 |
| 3,077,567 | 2/1963 | Gray | 331/113 R |
| 3,373,378 | 3/1968 | Cottrell | 331/145 |
| 3,395,363 | 7/1968 | McGrath et al. | 331/113 |
| 3,425,000 | 1/1969 | Dann | 331/113 |
| 3,582,809 | 6/1971 | Rigby | 331/113 |
| 3,688,213 | 8/1972 | Calaway | 331/145 |
| 3,725,681 | 4/1973 | Frederiksen | 331/111 |

OTHER PUBLICATIONS

Electronics, Dakin, pp. 40–43, Feb. 14, 1964.

*Primary Examiner*—John Kominski
*Attorney, Agent, or Firm*—Edward J. Norton; William Squire

[57] ABSTRACT

First and second like resistances are serially connected across a reactance element. Where the reactance element is a capacitor, a constant voltage is applied to first one terminal and then to the other terminal of the capacitor such that the capacitor discharges and charges first in one direction and then in the opposite direction through the respective resistances. When the reactance element is an inductance, a constant voltage is applied to the inductance and the two resistances in a manner to alternately reverse the direction of flow of current through the inductance. A sawtooth wave is produced when the waveforms appearing at each terminal of the reactance element are summed together.

8 Claims, 6 Drawing Figures

SAWTOOTH WAVEFORM GENERATOR

BACKGROUND OF THE INVENTION

The present invention relates to sawtooth waveform generators utilizing a reactance element. Present sawtooth waveform generators generate sawtooth waveforms by charging a capacitor with a constant current and then discharging the capacitor periodically. The time required for discharging the capacitor is called the flyback time and is limited by the finite on-resistance of the switch used.

With present state of the art technology, it has become increasingly important to provide sawtooth waveforms which have extremely rapid flyback times, for example, in a range less than ten nanoseconds. Such short duration flyback times are beyond the capabilities of conventional sawtooth waveform generators.

SUMMARY OF THE INVENTION

In the present invention, an apparatus is provided having first, second and third terminals. Circuit means including a reactance having a given value is coupled between the first and second terminals. A first resistance having a given value is coupled between the first and third terminals, and a second resistance having a given value is coupled between the second and third terminals. Cyclically controlled energizing means having a given cycle frequency is coupled to the first, second and third terminals for applying an energization signal in a given direction to the reactance during each odd cycle of the energization signal and for applying the energization signal to the reactance during each even cycle of the energization signal in a reverse direction with respect to the given direction.

IN THE DRAWINGS

FIG. 1*a* is a diagrammatic representation of a circuit useful in explaining the principles of the present invention, FIGS. 1*b* and 1*c* are waveforms useful in explaining the embodiment of the invention of FIG. 1*a*, FIG. 2 is a schematic diagram of a preferred embodiment of an apparatus constructed in accordance with the present invention, FIG. 3 is a circuit diagram of a second embodiment of the present invention, and FIG. 4 is a circuit diagram of a third embodiment of the present invention.

DETAILED DESCRIPTION

Figure 1A:
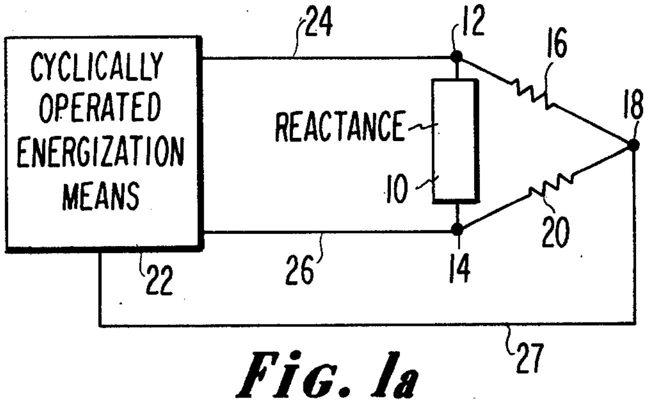

In FIG. 1*a*, a reactance 10 is coupled between terminals 12 and 14. A first resistance 16 is connected between terminal 12 and terminal 18. A second resistance 20 is connected between terminal 14 and terminal 18. Resistances 16 and 20 have substantially the same value. Cyclically operated energization means 22 includes a direct current source (not shown) for producing an energization signal E. Means 22 is coupled to the three terminals 12, 14, and 18 along respective leads 24, 26, and 27 for applying energization signal E to reactance 10. The energization signal E provided by means 22 may be either a constant voltage V or a constant current I. This signal may be provided by a constant voltage source, a constant current source, a current source with parallel resistance, or a voltage source in series with a resistor. Means 22 applies voltage V or current I via leads 24, 27 to terminal 12 in all even cycles and voltage V or current I via leads 26, 27 to terminal 14 in all odd cycles, alternately cycling voltage V or current I as the case may be, among leads 24 and 26.

Figure 1B:
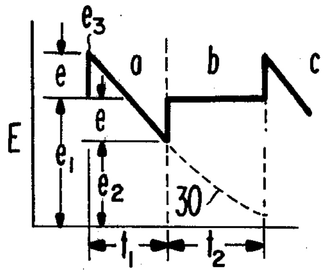
Figure 1C:
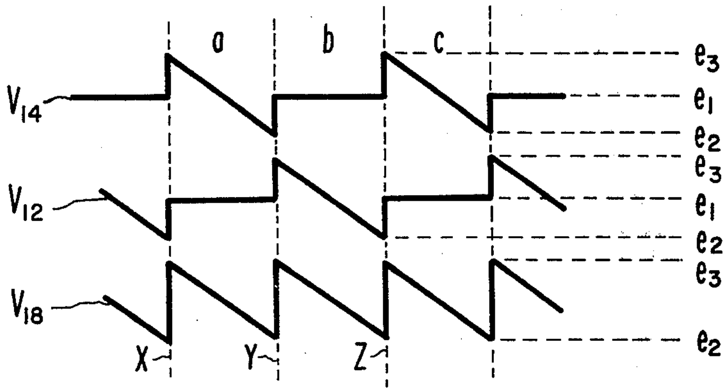

In FIG. 1b, assume signal E is current I, and cycles a and c are even and cycle b is odd, and that the conditions are steady state for purposes of explanation. In all even cycles current I is applied to terminal 12 and in all odd cycles to terminal 14. The waveform of FIG. 1b represents the waveform of the voltage at terminal 14. The waveforms appearing at terminals 12, 14 and 18 are shown by respective waveforms $V_{12}$, $V_{14}$ and $V_{18}$ of FIG. 1c. In each even cycle, *a, c* . . . , the voltage at terminal 12 has a constant magnitude of $e_1$ shown by waveform $V_{12}$ of FIG. 1c. In contradistinction, in all odd cycles, it can be seen that the magnitude $e_1$ of the voltage of waveform $V_{14}$ at terminal 14 is constant.

When a constant voltage V is applied to terminal 12 in the case where reactance 10 is capacitive, the voltage at terminal 14 jumps from magnitude $e_1$ to a peak value magnitude $e_3$. During cycle a, reactance 10 first discharges to magnitude $e_1$ exponentially at which magnitude the potential at terminals 12 and 14 are the same and continues to charge at substantially the same rate by charging exponentially through resistance 20 and terminal 18 to a magnitude of $e_2$. At this time, there is a charge proportional to $e$ ($e = e_1 - e_2$) in the reactance 10. If reactance 10 is permitted to continue to charge, the voltage of terminal 14 would follow the dotted line 30. Preferably, the time constant of resistances 16 and 20 with reactance 10 is made relatively long with respect to the cycle duration of cycles *a, b, c* . . . , so that the charge and discharge of the reactance 10 in each cycle is substantially linear. At the end of cycle *a*, period $t_1$, at the cycle boundary Y (FIG. 1*c*) voltage V is applied to terminal 14, which raises the magnitude of the voltage at terminal 14 from $e_2$ to $e_1$. Simultaneously, the voltage at terminal 12 jumps at the same cycle boundary Y from magnitude $e_1$ to magnitude $e_3$ ($e_3 = e_1 + e$) as best seen by waveform $v_{12}$ of FIG. 1c. In cycle *b*, reactance 10 is discharged and charged from magnitude $e_3$ to magnitude $e_2$ in the direction opposite to the direction of the action occurring in cycle *a* by a current flowing from terminal 12 through resistance 16 to terminal 18. The combined waveforms appearing at terminal 18 form sawtooth waveform $V_{18}$. The so-called flyback time in this waveform occurs at the cycle boundaries X, Y and Z, FIG. 1c, and is related to the switching period of means 22 in switching energization signal E such as voltage V between leads 24 and 26. With state of art devices, switching times, and thus flyback times of less than 10 ns, can be achieved.

Where reactance 10 is an inductance, means 22 cyclically applies energization signal E, i.e., a voltage across reactance 10, so that a current cyclically flows through resistances 16 and 20 from respective terminals 12 and 14. Means 22, in this case, includes means for cyclically, conductively coupling either terminal 12 along lead 24, or terminal 14 along lead 26 to a source of energization signal E in a given cycle so that current will flow along only one of leads 24 and 26 during that cycle.

For example, assume in all even cycles, means 22 causes a current I to flow between terminal 18 and means 22 along lead 24 and no current to flow along lead 26 to apply a certain voltage of a given polarity across terminals 12 and 14. In all odd cycles means 22 causes current I to flow between terminal 18 and means 22 along the lead 26 and no current to flow along lead 24 reversing the polarity of the certain voltage across terminals 12 and 14. It will be appreciated, where reactance 10 is an inductance, means 22 alternately reverses the polarity of the voltage applied across the inductance, thus reversing the direction of current flow through the inductance.

Whether reactance 10 is capacitive or inductive, it can be shown that the current produced in lead 27 has a sawtooth waveform. In case of a capacitive reactance, the voltage across reactance 10 remains initially unchanged. Immediately after switching the energization signal E, the current reverses its direction through reactance 10 and the voltage across reactance 10 changes exponentially towards an opposite polarity. In case of an inductive reactance, the current through reactance 10 remains initially unchanged, while the voltage thereacross reverses its direction. The current through the reactance then changes exponentially towards an opposite polarity.

To provide linearity when the reactance is a capacitance and the time period of voltage reversal is T, (T/RC) is made preferably less than 0.2. To provide linearity of one per cent where means 22 is a current source, T/RC should be no greater than 0.16. Where reactance 10 is an inductance, (TR/L)>0.2.

Figure 2:
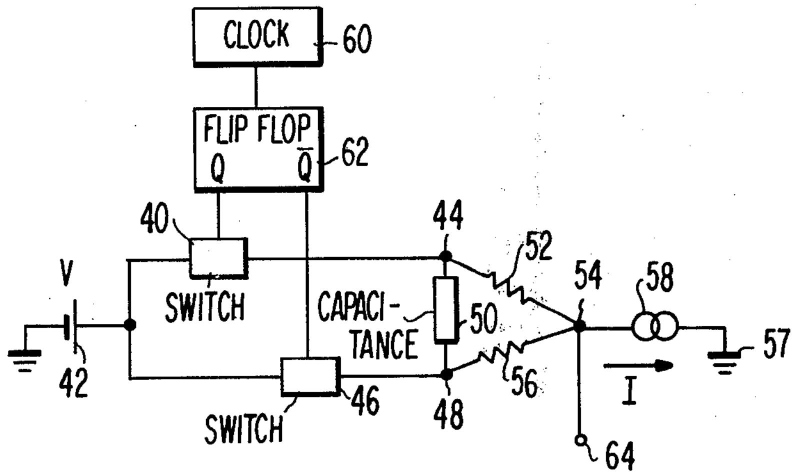

One exemplary arrangement utilizing a capacitive reactance is illustrated in FIG. 2. In this arrangement, the reactive element could also be inductive with similar results. In FIG. 2, a first switch 40 is connected between a bias voltage source 42 and terminal 44, while a second switch 46 is connected between bias voltage source 42 and terminal 48. A capacitance 50 is connected between terminals 44 and 48. A resistance 52 is connected between terminals 54 and 44, while a second resistance 56, having substantially the same value as resistance 52, is connected between terminals 48 aand 54. Terminal 54 is connected to ground terminal 57 through constant current source 58 which serves as the source of energization signal E. A clock 60 has its output connected to the trigger input of a triggerable flip-flop 62 whose Q output is connected to switch 40 and whose $\overline{Q}$ output is connected to switch 46.

Switches 40 and 46 are conventional electronic switches responsive to either a high or low signal, as the case may be, on the Q and $\overline{Q}$ outputs so that at any given instance one of switches 40 and 46 is closed while the other is open. For each successive clock period, the switch condition of switches 40 and 46 reverses. Thus, for each cycle of clock 60, the current I from source 58 is returned through one of terminals 44 and 48 through respective switches 40 and 46 and thence, in the next cycle, through the other terminal of terminals 44 and 48.

Capacitance 50 charges and discharges through resistances 52 and 56 in accordance with that one of terminals 44 and 48 through which the current from source 58 is returned as explained above. The peak-to-peak amplitude of the resulting waveform at terminal 54 is proportional to the level of the current I of source 58. The waveform appearing at terminal 54 is applied to output terminal 64 whose waveform appears as sawtooth waveform $V_{18}$ of FIG. 1c.

Figure 3:
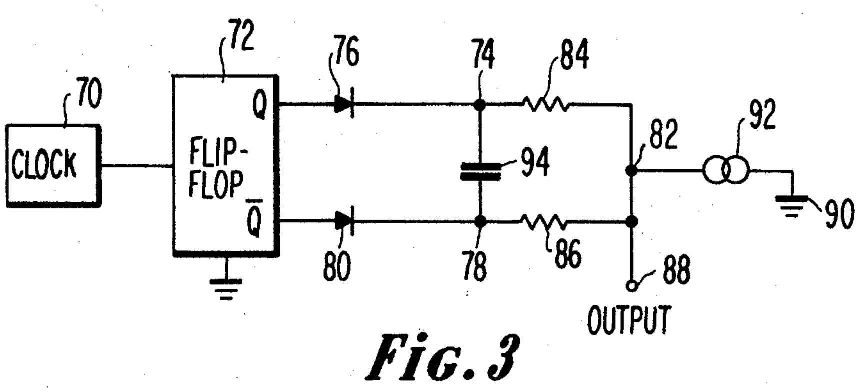

A second embodiment of the present invention utilizing a capacitance is illustrated in FIG. 3 wherein a clock 70 has its output coupled to the trigger input of triggerable flip-flop 72 whose Q output is applied to terminal 74 through diode 76 and whose $\overline{Q}$ output is applied to terminal 78 through diode 80. Capacitance 94 is connected between terminals 74 and 78. Terminal 74 is connected to terminal 82 through resistance 84, while resistance 86 is connected between terminals 82 and 78. Output terminal 88 is connected to terminal 82, while ground terminal 90 is connected to terminal 82 through constant current source 92, which serves as the source of energization signal E.

In this embodiment, after the clock signal in a given cycle from clock 70 is applied to flip-flop 72, the signals appearing at the Q and $\overline{Q}$ outputs of flip-flop 72 in that cycle provide the switching voltage which switches the selected ones of diodes 76 and 80 on and off. A high signal appears at the Q output of flip-flop 72 and then at the $\overline{Q}$ output and conversely, in alternate cycles, a low appears at the Q output and then at the $\overline{Q}$ output. Where the reactance is a capacitor, the voltage across the open switch 40 or 46 of FIG. 2 is in a reverse direction with respect to the current direction through the closed switch 40 or 46 of FIG. 2. Therefore, these switches can be replaced by the diodes 76 and 80 of FIG. 3. The Q and $\overline{Q}$ outputs provide a return path for the current I through terminals 74 and 78 in alternate cycles via diodes 76 and 80. The resultant waveform appearing at terminal 88 is illustrated by waveform $V_{18}$ of FIG. 1c. With this embodiment, it has been found that a unit, actually constructed having a capacitor 94 of about 500 picofarads and resistances 84 and 86 of 5000 ohms each, generated a satisfactory sawtooth waveform, with three volts applied to terminals 74 and 78, and utilizing normal transistor-to-transistor logic. By making capacitances 94 or 50 of FIGS. 3 and 2, respectively, large with respect to parasitic capacitances, a relatively pure sawtooth waveform is formed.

Figure 4:
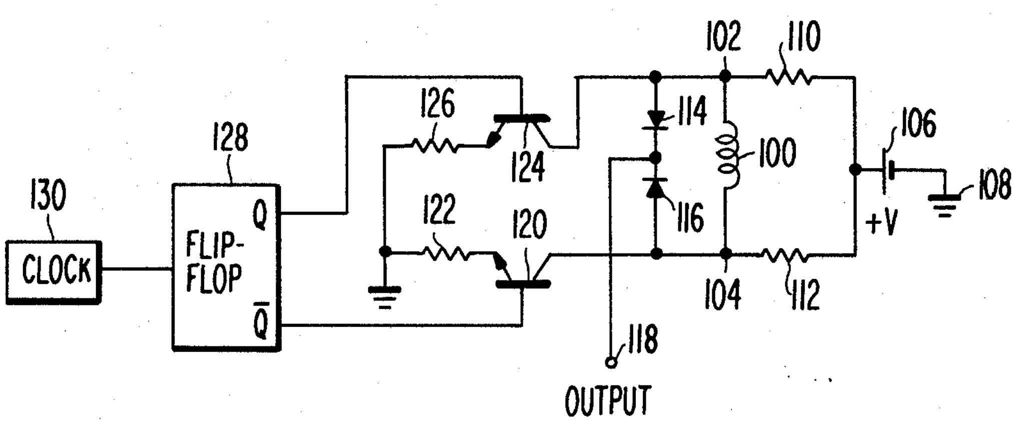

In FIG. 4, there is illustrated an embodiment of the present invention utilizing an inductance, wherein inductance 100 is connected between terminals 102 and 104. A source of voltage 106 is connected between ground terminal 108 and terminal 102 through resistance 110 and through a second resistance 112 having substantially the same value as resistance 110 to terminal 104. Connected across inductance 100 are two diodes 114 and 116 having their cathodes connected together and the anodes connected to a different one of terminals 102 and 104, as shown. Output terminal 118 is connected to the junction of the cathodes of diodes 114 and 116. Terminal 104 is connected to ground through the collector-emitter path of transistor 120 and series resistance 122 which serve as a switchable constant current source. Terminal 102 is connected to ground through the collector-emitter path of transistor 124 and series resistance 126, which also serve as a switchable constant current source. The base of transistor 120 is connected to the $\overline{Q}$ output of flip-flop 128, while the base of transistor 124 is connected to the Q output of flip-flop 128. A clock 130 has its output applied to the trigger input of a triggerable flip-flop 128 to cause the respective Q and $\overline{Q}$ outputs to alternately switch from high to low and low to high potentials in successive clock cycles. Transistor 120 and resistor 122 and transistor 124 and resistor 126 in forming respective switchable current sources, replace current source 58 and switches 40 and 46 of FIG. 2.

Whenever the Q output of flip-flop 128 is high, transistor 124 conducts and a current is injected at terminal 102. At this time, a current flows from voltage source 106 through resistance 112 and inductance 100 to terminal 102 through resistance 110 to terminal 102 to system ground through the collector emitter path of transistor 124. In the next cycle, transistor 124 is turned off and transistor 120 is turned on and the current now flows from voltage source 106 through resistance 112 to terminal 104 and through resistance 110 and inductance 100 from terminal 102 to terminal 104 and thence through the collector-emitter path of transistor 120 to system ground. As a result, there is a current reversal in inductance 100 due to the reversal of the polarity of the voltage applied thereacross which causes a current waveform to appear at each of terminals 102 and 104 of the type illustrated in FIG. 1*b*. The waveform appearing at terminal 102 is detected by diode 114, while the waveform appearing at terminal 104 is detected by diode 116 and both detected waveforms are applied to output terminal 118. As a result, the current waveforms appearing at terminals 102 and 104 are summed and appear similar to waveform $V_{18}$ of FIG. 1*c*.

It is to be understood that in the modes of operation using capacitance or inductive reactances, there is residual energy in the reactive element at the time the direction of the energization signal applied thereto is reversed.

What is claimed is:

1. In combination:

first, second and third terminals, circuit means including a reactance having a given value connected directly between said first and second terminals, a first resistance having a given value connected directly between said first and third terminals, and a second resistance having a given value connected directly between said second and third terminals, and cyclically controlled energizing means having a given cycle frequency coupled to said first, second and third terminals for applying an energization signal in a given direction to said reactance during each odd cycle of said energization signal and for applying said energization signal to said reactance during each even cycle of said energization signal in a reverse direction with respect to said given direction to thereby produce a sawtooth waveform solely at one of said first and second terminals solely during said odd cycle when said energization signal is applied in said given direction and a sawtooth waveform solely at the other of said first and second terminals solely during said even cycle when said energization signal is applied in said reverse direction, said circuit means interdigitizing said waveforms whereby a continuous sawtooth waveform is produced for each said cycle.

2. The combination of claim 1 wherein said reactance is an inductance and said energization means includes means for selectively applying a voltage of a given polarity and value across said inductance in each odd cycle and a voltage of a polarity opposite said given polarity and of substantially the same value as said given value in each even cycle to selectively reverse the direction of current flow in said inductance.

3. In combination, first, second and third terminals, circuit means including a capacitance having a given value connected directly between said first and second terminals, a first resistance having a given value connected directly between said first and third terminals, and a second resistance having a given value connected directly between said second and third terminals, and cyclically controlled switch means having a given cycle frequency coupled to said first and second terminals for selectively applying a direct current to one of said first and second terminals during each odd cycle of said switch means and for selectively applying a direct current to the other of said first and second terminals during each even cycle of said switch means to thereby produce a sawtooth waveform solely at said other terminal solely during said odd cycle and a sawtooth waveform solely at said one terminal solely during said even cycle, said circuit means interdigitizing said waveforms such that a continuous sawtooth waveform is produced for each said cycle.

4. The combination of claim 3 wherein said cyclically controlled switch means includes means for generating a periodic signal at said given frequency, and first and second switch means responsive to said periodic signal applied thereto for applying said direct current to one of said first and second terminals during said odd cycle and to the other of said first and second terminals during said even cycle.

5. The combination of claim 4 wherein said first and second switch means each include a separate, different switch each having open and closed states and responsive to a switch control signal applied as an input thereto for selectively placing each of said switches in a selected one of said states and a flip-flop coupled between said signal generating means and said switches for generating said switch control signal in response to said periodic signal applied as an input thereto, said switch control signal placing one of said switches in the open state and the other switch in the closed state in an odd cycle and said one switch in the closed state and the other switch in the open state in an even cycle.

6. In combination:

first, second and third terminals, a pair of input terminals for receiving a direct current applied as an input thereto, a capacitance coupled between said first and second terminals, first switch means having open and closed switch conditions coupled between one of said input terminals and said first terminal, second switch means having open and closed switch conditions coupled between the other of said input terminals and said second terminal, means for coupling said input terminals to said third terminal, a first resistance having a given value connected directly between said first and third terminals, a second resistance having a given value connected directly between said second and third terminals, and means for cyclically controlling at a given frequency the switch condition of said first and second switch means so as to place one of said switch means in said closed switch condition and the other switch means in said open switch condition during each odd cycle and to place said one switch means in said open switch condition and said other switch means in said closed switch condition during each even cycle, said received direct current being applied to one of said first and second terminals in all even cycles and to the other of said first and second terminals in all odd cycles to thereby produce a sawtooth waveform solely at said one terminal in all odd cycles and solely at said other terminal in all even cycles, said resistances interdigitizing said waveforms whereby a continuous sawtooth waveform is produced for each said cycle at said third terminal.

7. The combination of claim 6 wherein said first switch means includes a first diode coupled between said first terminal and one of said input terminals and a second diode coupled between said second terminal and the other of said input terminals.

8. The combination of claim 7 wherein said switch means includes a flip-flop having a pair of output terminals each being connected to a different one of said first and second diodes, said flip-flop being responsive to a periodic signal applied as an input thereto for switching one of said diodes into conduction and turning the other diode off in a given cycle.

* * * * *